(12) United States Patent
Goto et al.

(10) Patent No.: US 8,853,914 B2
(45) Date of Patent: Oct. 7, 2014

(54) SEGMENTED STATOR CORE WITH TRAPEZOIDAL JUNCTIONS

(75) Inventors: Kazuhiro Goto, Toyota (JP); Tatsuhiko Mizutani, Toyota (JP); Hiroyuki Ikuta, Kariya (JP); Yasuhide Yagyu, Aichi-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 371 days.

(21) Appl. No.: 13/510,189

(22) PCT Filed: Feb. 3, 2010

(86) PCT No.: PCT/JP2010/051474
§ 371 (c)(1),
(2), (4) Date: May 16, 2012

(87) PCT Pub. No.: WO2011/096050
PCT Pub. Date: Aug. 11, 2011

(65) Prior Publication Data
US 2012/0228987 A1    Sep. 13, 2012

(51) Int. Cl.
*H02K 1/14* (2006.01)
*H02K 1/18* (2006.01)

(52) U.S. Cl.
CPC ............ *H02K 1/148* (2013.01); *H02K 2201/09* (2013.01); *H02K 2213/03* (2013.01)
USPC .............................. 310/216.009; 310/216.048

(58) Field of Classification Search
CPC ......... H02K 1/14; H02K 1/141; H02K 1/143; H02K 1/148; H02K 1/18
USPC ..................... 310/216.009, 216.007, 216.008, 310/216.048
See application file for complete search history.

(56) References Cited

U.S. PATENT DOCUMENTS

| | | | |
|---|---|---|---|
| 2009/0066183 A1* | 3/2009 | Aramaki et al. | 310/217 |
| 2010/0001611 A1* | 1/2010 | Utaka et al. | 310/216.009 |

FOREIGN PATENT DOCUMENTS

| | | | | | |
|---|---|---|---|---|---|
| JP | 10-285840 | A | | 10/1998 | |
| JP | 2001-45684 | A | | 2/2001 | |
| JP | 2001045684 | A | * | 2/2001 | ............... H02K 1/18 |
| JP | 2002-199628 | A | | 7/2002 | |
| JP | 2003-264944 | A | | 9/2003 | |
| JP | 2004-289908 | A | | 10/2004 | |
| JP | 2004289908 | A | * | 10/2004 | ............... H02K 1/18 |

(Continued)

OTHER PUBLICATIONS

Machine translation of JP 2004289908 A (Oct. 2004).*

(Continued)

*Primary Examiner* — Michael Andrews
(74) *Attorney, Agent, or Firm* — Sughrue Mion, PLLC

(57) ABSTRACT

A stator core capable of improving stator core segments in assemblability, positioning accuracy and rigidity is provided. A stator core includes a plurality of stator core segments, and a yoke part of each stator core segment has a first junction and a second junction joined to other adjacent stator core segments. A protrusion is formed at the first junction, and a recess capable of receiving the protrusion is formed at the second junction. The opening area of the recess increases from a deepest section of the recess to an opening of the recess. In the yoke part, a first caulking site where the stator core segment is caulked in an axial direction is formed on an arc passing through the central part of a radial length of the protrusion and extending in a circumferential direction.

5 Claims, 10 Drawing Sheets

(56) References Cited

FOREIGN PATENT DOCUMENTS

| JP | 2006-340509 A | 12/2006 |
| JP | 2006-352991 A | 12/2006 |
| JP | 2007-129835 A | 5/2007 |
| JP | 2007-159170 A | 6/2007 |
| JP | 2008-206262 A | 9/2008 |
| JP | 2009-011063 A | 1/2009 |
| WO | 2006/120975 A1 | 11/2006 |

OTHER PUBLICATIONS

Machine translation of JP 2001045684 A (Feb. 2001).*
International Search Report of PCT/JP2010/051474, dated May 11, 2010.

* cited by examiner

SEGMENTED STATOR CORE WITH TRAPEZOIDAL JUNCTIONS

CROSS REFERENCE TO RELATED APPLICATIONS

This application is a National Stage of International Application No. PCT/JP2010/051474 filed Feb. 3, 2010, the contents of all of which are incorporated herein by reference in their entirety.

TECHNICAL FIELD

The present invention relates to a stator core, and particularly relates to a stator core used as a stator of a rotating electric machine.

BACKGROUND ART

For stator cores for rotating electric machines, various techniques have conventionally been proposed. For example, Japanese Patent Laying-Open No. 2006-352991 (Patent Literature 1) proposes a stator core, wherein strip core raw materials, each having a recess at an end face of one end and a protrusion at an end face of the opposite end, are fitted to achieve coupling when being plastically deformed to form a cylindrical shape, and a constriction is provided at the mouth of the recess or the neck portion of the protrusion to thereby prevent falling-out after fitting.

Japanese Patent Laying-Open No. 2006-340509 (Patent Literature 2) proposes a technique wherein a joint surface between stator core segments represents an approximately trapezoidal uneven shape, and the joint surface area with other stator core segments is increased to reduce magnetic resistance. Japanese Patent Laying-Open No. 2007-129835 (Patent Literature 3) proposes a technique wherein a joint surface between stator core segments represents an uneven shape, and an abutting pressure is made larger at an abutment on the inner circumferential side than at an abutment on the outer circumferential side. Japanese Patent Laying-Open No. 2008-206262 (Patent Literature 4) proposes a technique wherein a joint surface between stator core segments represents a stepped shape, and represents an uneven shape when viewed in plan view.

CITATION LIST

Patent Literature

PTL 1: Japanese Patent Laying-Open No. 2006-352991
PTL 2: Japanese Patent Laying-Open No. 2006-340509
PTL 3: Japanese Patent Laying-Open No. 2007-129835
PTL 4: Japanese Patent Laying-Open No. 2008-206262

SUMMARY OF INVENTION

Technical Problem

In the stator core disclosed in Japanese Patent Laying-Open No. 2006-352991 (Patent Literature 1), the protrusion is pressed and fitted into the recess formed in a yoke part of the stator core. Therefore, pressurization in a circumferential direction is required at the time of assembly of the stator core segments, resulting in poor assemblability.

On the other hand, an outer casing is shrink fitted with the stator core segments being arranged annularly, so that the stator core segments are secured to form a cylindrical stator core. Because shrink fitting is carried out from the outer circumferential side, a stress in the radially inward direction acts on the stator core segments. Then, if the rigidity of the stator core is low, problems of degraded positioning accuracy of the stator core depending on the accuracy of the outer casing, occurrence of buckling, and the like arise. It is necessary to improve the circularity of the stator core by ensuring the positioning accuracy of the stator core segments against the action of stress from the outer casing. Moreover, in order to prevent the stator core segments from buckling due to the stress, the stator core segments need to be improved in rigidity.

The present invention was made in view of the above-described problems, and has a main object to provide a stator core wherein stator core segments can easily be assembled and the stator core segments can be improved in positioning accuracy and rigidity.

Solution to Problem

A stator core according to the present invention includes a plurality of stator core segments. The stator core segments are arranged annularly. The stator core segments are formed by stacking a plurality of steel plates in an axial direction. The stator core segment includes a yoke part extending in a circumferential direction. The yoke part has a first junction provided at one end thereof in the circumferential direction and a second junction provided at the other end thereof in the circumferential direction. The first junction and the second junction join the stator core segment and an other adjacent stator core segment when the stator core segments are arranged annularly. A protrusion protruding toward the other adjacent stator core segment is formed at the first junction. A recess capable of receiving the protrusion is formed at the second junction. The recess is formed such that an opening area increases from a deepest section of the recess to an opening of the recess. In the yoke part, a first caulking site where the stator core segment is caulked in the axial direction to integrate the steel plates is formed on an arc passing through a central part of a radial length of the protrusion and extending in the circumferential direction.

Preferably, in the above-described stator core, the protrusion and the recess are each formed such that a sectional shape perpendicular to the axial direction represents a substantially trapezoidal shape. When fitting the protrusion into the recess, an oblique line of the substantially trapezoidal shape of the protrusion and an oblique line of the substantially trapezoidal shape of the recess come into surface contact.

Preferably, in the above-described stator core, the first caulking site is formed in proximity to the first junction of the yoke part.

Preferably, in the above-described stator core, each of the stator core segments further includes two teeth portions protruding from the yoke part toward an inner side in a radial direction.

Preferably, in the above-described stator core, in the yoke part, a second caulking site where the stator core segments is caulked in the axial direction is formed at the center between the two teeth portions in the circumferential direction.

Preferably, in the above-described stator core, a third caulking site where the stator core segment is caulked in the axial direction is formed in proximity to the second junction of the yoke part. A spacing between the first caulking site and the second caulking site in the circumferential direction is equal to the spacing between the second caulking site and the third caulking site in the circumferential direction.

Preferably, in the above-described stator core, the third caulking site is formed on an arc passing through a central part of a radial length of the opening and extending in the circumferential direction.

Advantageous Effects of Invention

According to the stator core of the present invention, stator core segments can be assembled easily, and the stator core segments can be improved in positioning accuracy and rigidity.

DESCRIPTION OF EMBODIMENTS

Hereinafter, embodiments of the present invention will be described based on the drawings. It is noted that, in the following drawings, the same or corresponding parts have the same reference number allotted, and description thereof will not be repeated.

First Embodiment

Figure 1:
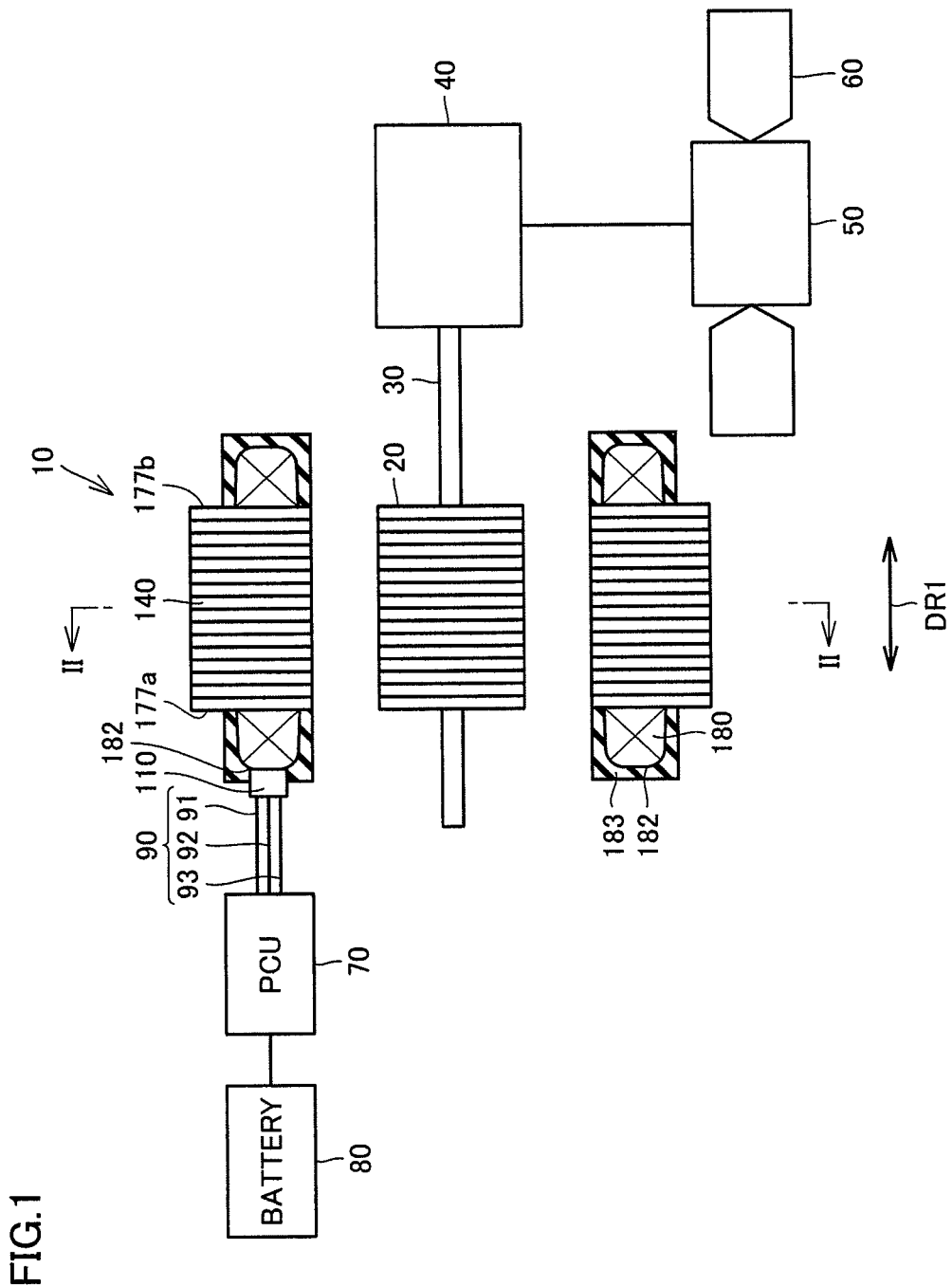
FIG. 1 is a schematic view showing a structure of a hybrid vehicle including a stator to which a stator core of a first embodiment is applied.

FIG. 1 is a schematic view showing a structure of a hybrid vehicle (HV: hybrid vehicle) including a stator 140 to which a stator core of a first embodiment is applied. As shown in FIG. 1, the hybrid vehicle includes a rotating electric machine 10, a rotation shaft 30, a speed reduction mechanism 40, a differential mechanism 50, and a drive shaft receiving portion 60. Rotating electric machine (motor-generator) 10 having the function as an electric motor or a power generator includes a rotor 20 and stator 140.

Rotor 20 is assembled with rotation shaft 30. A permanent magnet not shown is embedded in rotor 20. That is, rotating electric machine 10 is an IPM (Interior Permanent Magnet) motor. Rotation shaft 30 is rotatably supported by a housing part of a drive unit of the hybrid vehicle with a bearing interposed therebetween. Rotor 20 is secured to rotation shaft 30, and is provided to be capable of rotating with rotation shaft 30. Annular stator 140 is provided around rotor 20, and is arranged at the outer circumference of rotor 20.

A coil 180 is mounted on axial end faces 177a, 177b of stator 140. Coil 180 has a coil end portion 182. Coil end portion 182 protrudes in an axial direction DR1 indicated by a double-headed arrow in FIG. 1 relative to axial end face 177a of stator 140. A terminal block 110 is arranged at coil end portion 182. Terminal block 110 is arranged at an end of stator 140 in the axial direction. Coil end portion 182 and terminal block 110 are secured integrally by an insulating mold resin portion 183. This mold resin portion 183 contains, for example, thermosetting resin such as BMC (Bulk Molding Compound) or epoxy resin, thermoplastic resin such as PPS (Polyphenylene Sulfide) or PBT (Polybutylene Terephthalate), or the like.

Coil 180 is electrically connected to a PCU (Power Control Unit) 70 via a three-phase cable 90 with terminal block 110 interposed therebetween. Three-phase cable 90 is formed of a U-phase cable 91, a V-phase cable 92 and a W-phase cable 93. Coil 180 is formed of a U-phase coil, a V-phase coil and a W-phase coil. U-phase cable 91, V-phase cable 92 and W-phase cable 93 are connected to terminals of these three coils, respectively. PCU 70 is electrically connected to battery 80 via a feeder cable. Battery 80 and stator 140 are thereby electrically connected to each other.

The driving force output from rotating electric machine 10 including rotor 20 and stator 140 is transmitted to drive shaft receiving portion 60 via speed reduction mechanism 40 and differential mechanism 50. The driving force transmitted to drive shaft receiving portion 60 is transmitted as a rotary force to a driving wheel not shown via a drive shaft not shown to allow the hybrid vehicle to travel.

On the other hand, at the time of regenerative braking of the hybrid vehicle, the driving wheel is rotated by an inertial force of the vehicular body. Rotating electric machine 10 is driven by the rotary force from the driving wheel via drive shaft receiving portion 60, differential mechanism 50 and speed reduction mechanism 40. At this time, rotating electric machine 10 operates as a power generator. Electric power generated by rotating electric machine 10 is stored in battery 80 via an inverter in PCU 70.

Figure 2:
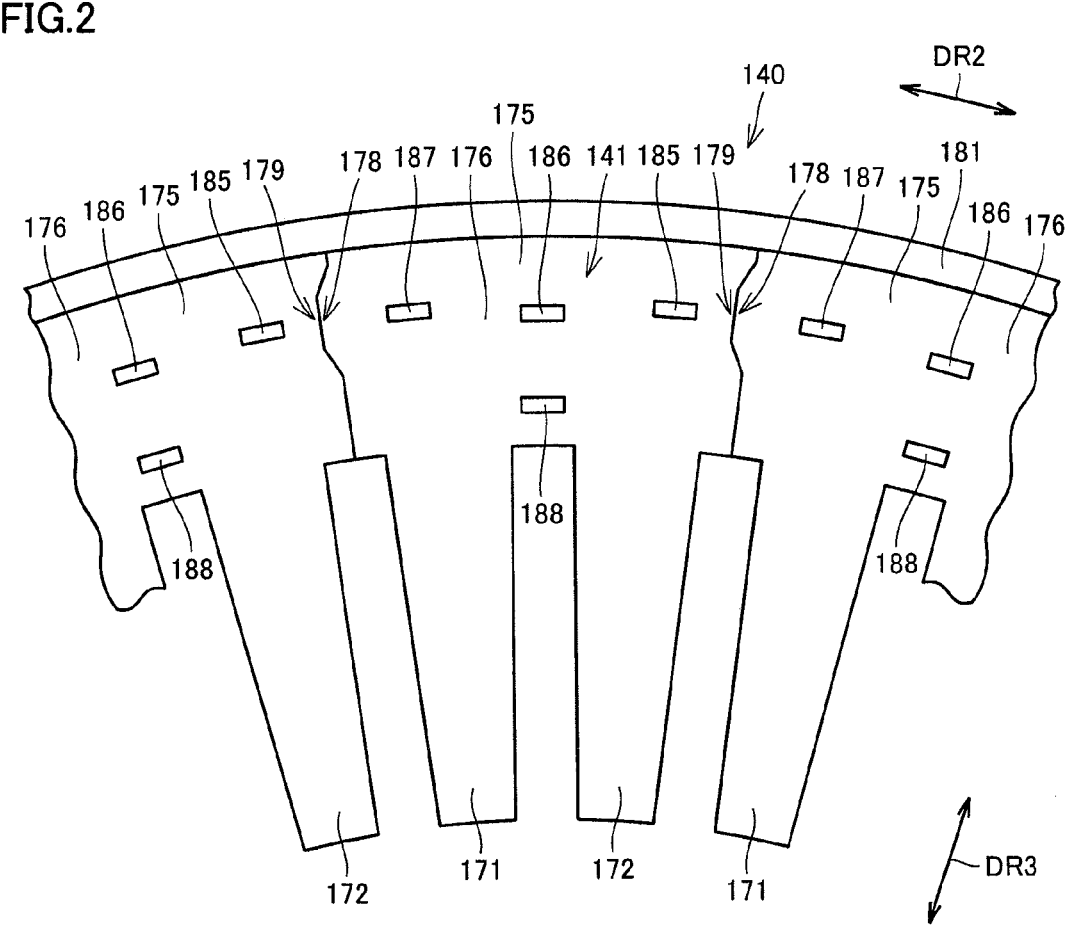
FIG. 2 is a drawing showing part of the stator as viewed in plan view in the axial direction.

FIG. 2 is a drawing showing part of stator 140 as viewed in plan view in axial direction DR1. As shown in FIG. 2, stator 140 includes a stator core 141 formed to represent an annular cylindrical shape in cross section and a ring 181 mounted on the outer circumference of this stator core 141. Stator core 141 includes a plurality of stator core segments 175 separated in the circumferential direction. Respective stator core segments 175 are arranged in the circumferential direction and disposed annularly, so that cylindrical stator core 141 is formed. A circumferential direction DR2 and a radial direction DR3 of stator core 141 are indicated by double-headed arrows shown in FIG. 2.

Each stator core segment 175 includes a circular yoke part 176 extending in circumferential direction DR2 of stator core 141. Each stator core segment 175 further includes stator teeth 171, 172 as two teeth portions protruding from this yoke part 176 toward the inner side of stator core 141 in radial direction DR3. Stator teeth 171, 172 are formed at regular intervals in circumferential direction DR2. Stator 140 includes yoke part 176 extending annularly and plurality of stator teeth 171, 172 protruding in the radially inward direction from the inner circumferential surface of this yoke part 176.

A slot is created between stator teeth 171, 172 adjacent to each other in circumferential direction DR2 of stator core 141. Coil 180 shown in FIG. 1 is received in this slot and wounded around stator teeth 171, 172 to be mounted on stator core segments 175. An insulator not shown that ensures insulation between coil 180 and stator core segments 175 is interposed between coil 180 and stator core segments 175.

Ring 181 is mounted at the outer circumferential side of stator core segments 175 arranged annularly. Respective stator core segments 175 are secured by ring 181 to form annular stator core 141.

A first junction 178 is provided at one end which is one of the both end portions in circumferential direction DR2 of yoke part 176 extending in circumferential direction DR2, and a second junction 179 is provided at the other end which is the other end portion. Yoke part 176 has first junction 178 and second junction 179 provided at the both ends in circumferential direction DR2. When stator core segments 175 are arranged annularly, first junction 178 joins stator core segment 175 and another stator core segment adjacent thereto at one side in circumferential direction DR2. Second junction 179 joins stator core segment 175 and another stator core segment adjacent thereto at the other side in circumferential direction DR2.

First junction 178 of stator core segment 175 abuts on second junction 179 of another stator core segments 175 adjacent to stator core segment 175 of interest in circumferential direction DR2. Second junction 179 of stator core segment 175 abuts on first junction 178 of another stator core segments 175 adjacent to stator core segment 175 of interest in circumferential direction DR2. First junction 178 and second junction 179 function as circumferential coupling parts that couple stator core segment 175 and other stator core segments adjacent thereto in circumferential direction DR2.

A caulking site 187 where stator core segment 175 is caulked in axial direction DR1 which is a direction perpendicular to the sheet of FIG. 2 is formed in proximity to first junction 178 of yoke part 176. A caulking site 186 as a second caulking site where stator core segment 175 is caulked in axial direction DR1 is formed at the center of yoke part 176 in circumferential direction DR2 between two stator teeth 171, 172. A caulking site 185 as a third caulking site where stator core segment 175 is caulked in axial direction DR1 is formed in proximity to second junction 179 of yoke part 176. A caulking site 188 as a fourth caulking site is formed at the inner side in radial direction DR3 relative to caulking site 186.

Stator core segment 175 is formed by stacking a plurality of electromagnetic steel plates in axial direction DR1. When stator core segment 175 is formed of a plurality of electromagnetic steel plates, the electromagnetic steel plates are caulked and secured together to be integrated in axial direction DR1 by means of caulking sites 185 to 188, to thereby form integral stator core segment 175.

Figure 3:
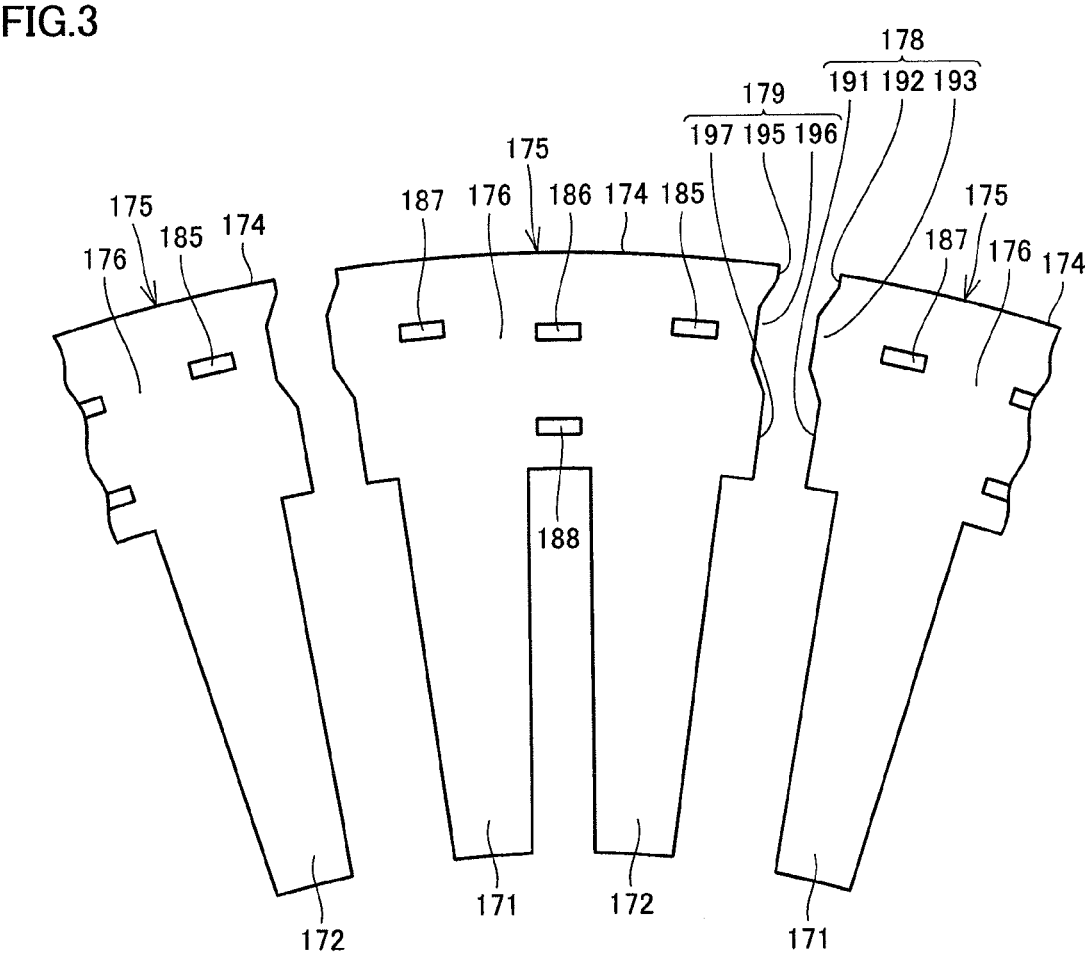
FIG. 3 is an exploded view of the stator core shown in FIG. 2.

FIG. 3 is an exploded view of stator core 141 shown in FIG. 2. As shown in FIG. 3, first junction 178 includes a proximal surface 191 at the radially inner side extending in radial direction DR3, a distal surface 192 at the radially outer side extending in radial direction DR3, and a protrusion 193 between proximal surface 191 and distal surface 192. Protrusion 193 is formed at first junction 178. Proximal surface 191, distal surface 192 and protrusion 193 form a first circumferential end face of yoke part 176 extending in circumferential direction DR2. Protrusion 193 of stator core segment 175 protrudes toward another stator core segment adjacent to stator core segment 175 of interest in circumferential direction DR2.

Second junction 179 includes a proximal surface 197 at the radially inner side extending in radial direction DR3, a distal surface 195 at the radially outer side extending in radial direction DR3, and a recess 196 between proximal surface 197 and distal surface 195. Recess 196 is formed at second junction 179. Proximal surface 197, distal surface 195 and recess 196 form the second circumferential end face of yoke part 176 extending in circumferential direction DR2. Recess 196 of stator core segment 175 is formed in a depressed shape recessed relative to first junction 178 of another stator core segment adjacent to stator core segment 175 of interest in circumferential direction DR2. Recess 196 is formed in a shape capable of receiving protrusion 193.

Protrusion 193 included in first junction 178 is formed such that the shape perpendicular to axial direction DR1 which is a direction perpendicular to the sheet of FIG. 3 represents a substantially trapezoidal shape. Recess 196 included in second junction 179 is formed such that the shape perpendicular to axial direction DR1 which is the direction perpendicular to the sheet of FIG. 3 represents a substantially trapezoidal shape. Protrusion 193 and recess 196 are each formed to have a sectional shape perpendicular to axial direction DR1 representing a substantially trapezoidal shape.

Figure 4:
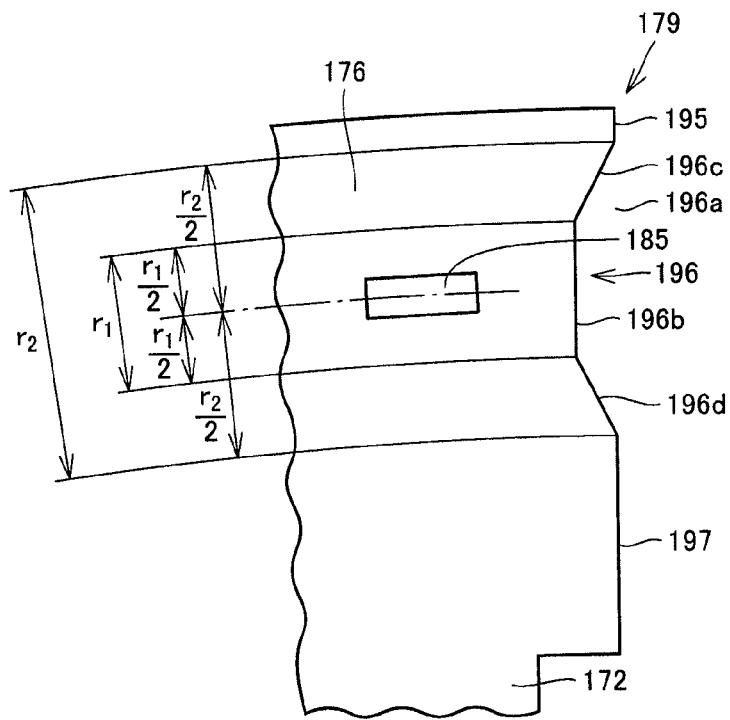
FIG. 4 is a drawing of a stator core segment shown in FIG. 3, showing a second junction and therearound on an enlarged scale.

FIG. 4 is a drawing of stator core segment 175 shown in FIG. 3, showing second junction 179 and therearound on an enlarged scale. As shown in FIG. 4, recess 196 formed to represent a substantially trapezoidal shape has an opening 196a at which the recess opens in circumferential direction DR2, a deepest section 196b forming the bottom part of the recess, and sidewall sections 196c, 196d extending from deepest section 196b to opening 196a. Opening 196a corresponds to the lower base of the trapezoid formed by recess 196. Deepest section 196b corresponds to the upper base of the trapezoid formed by recess 196. Sidewall sections 196c, 196d correspond to oblique lines connecting the upper and lower bases of the trapezoid formed by recess 196.

If proximal surface 197 and distal surface 195 of second junction 179 are formed on the same plane extending in radial direction DR3 and deepest section 196b is formed as a plane extending in radial direction DR3, then, the plane formed by opening 196a and the plane formed by deepest section 196b become almost parallel to each other, so that recess 196 represents a substantially trapezoidal shape. Proximal surface 197 and distal surface 195 may be formed on the same plane extending in radial direction DR3, and deepest section 196b may be formed on a surface parallel to that plane, so that recess 196 may be formed in a trapezoidal shape. Sidewall sections 196c, 196d may have the same length on the plane shown in FIG. 4, that is, on a cross section of stator core segment 175 perpendicular to axial direction DR1. In this case, recess 196 is formed in a substantially isosceles trapezoidal shape.

Since recess 196 is formed in a substantially trapezoidal shape, the opening area increases from deepest section 196b of recess 196 to opening 196a of recess 196. Here, the opening area refers to the cross section perpendicular to the depth direction of recess 196, that is, in the present embodiment, the area of the opening of yoke part 176 formed by recess 196 in the cross section of annular stator core 141 perpendicular to circumferential direction DR2. Sidewall sections 196c, 196d of recess 196 are inclined in circumferential direction DR2 such that the opening area of recess 196 increases gradually, that is, such that the radial length of recess 196 increases as they approach opening 196a from deepest section 196b in circumferential direction DR2.

As shown in FIG. 4, recess 196 is formed to have deepest section 196b of a radial length r1 and opening 196a of a radial length r2. On the plane shown in FIG. 4, the midpoint of a line segment of length r1 formed by deepest section 196b extending in the radial direction and the midpoint of a line segment of length r2 formed by opening 196a extending in the radial direction are arranged on the same circle centering on a point corresponding to the central axis of annular stator core 141. The midpoint of the line segment formed by deepest section 196b and the midpoint of the line segment formed by opening 196a are located on the same arc extending in circumferential direction DR2. Caulking site 185 extends along the above-described arc.

The position at which caulking site 185 is formed in radial direction DR3 corresponds to the central point of radial length r1 of deepest section 196b extending in radial direction DR3 and radial length r2 of the virtual plane extending in radial direction DR3 formed by opening 196a. Caulking site 185 extends in circumferential direction DR2, and caulking site 185 is formed such that the curve along which caulking site 185 extends equally divides deepest section 196b and opening 196a into halves in radial direction DR3. Caulking site 185 is formed on an arc passing through the central part of radial length r2 of opening 196a and extending in circumferential direction DR2, and is formed on an arc passing through the central part of radial length r1 of deepest section 196b and extending in circumferential direction DR2.

When viewed in plan view in axial direction DR1, caulking site 185 is formed on an arc centering on a point corresponding to the central axis of annular stator core 141 and on an arc passing through the central part of recess 196 in radial direction DR3. Therefore, on the plane shown in FIG. 4, the distance between the ends of deepest section 196b and caulking site 185 in radial direction DR3 is half of radial length r1 of deepest section 196b, i.e., r1/2. Besides, on the plane shown in FIG. 4, the distance between the ends of opening 196a and caulking site 185 in radial direction DR3 is half of radial length r2 of opening 196a, i.e., r2/2.

Figure 5:
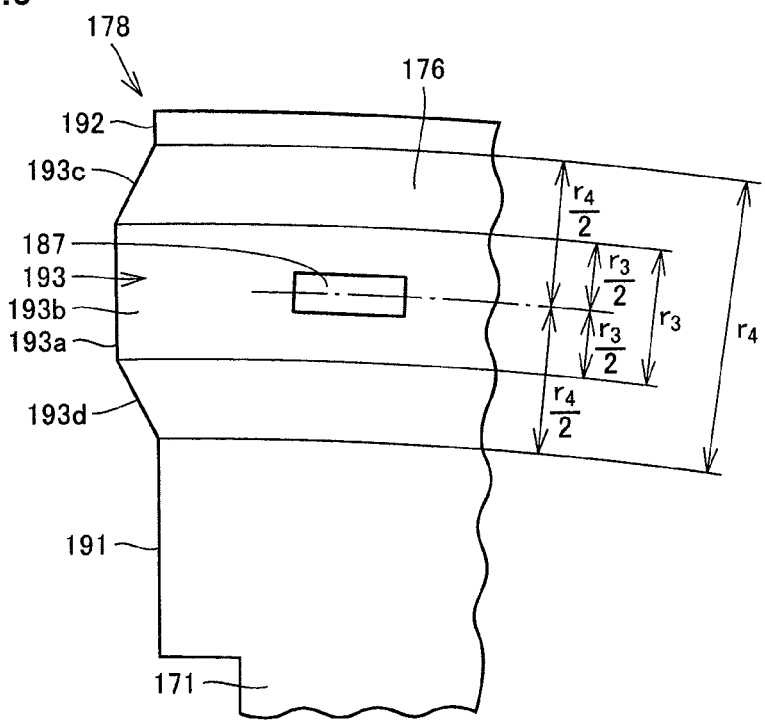
FIG. 5 is a drawing of the stator core segment shown in FIG. 3, showing a first junction and therearound on an enlarged scale.

FIG. 5 is a drawing of stator core segment 175 shown in FIG. 3, showing first junction 178 and therearound on an enlarged scale. As shown in FIG. 5, protrusion 193 formed in a substantially trapezoidal shape has a leading end section 193a forming a leading end of protrusion 193 in circumferential direction DR2, a root section 193b forming the root of protrusion 193, and sidewall sections 193c, 193d extending from root section 193b to leading end section 193a. Leading end section 193a corresponds to the upper base of the trapezoid formed by protrusion 193. Root section 193b corresponds to the lower base of the trapezoid formed by protrusion 193. Sidewall sections 193c, 193d correspond to oblique lines connecting the upper and lower bases of the trapezoid formed by protrusion 193.

If proximal surface 191 and distal surface 192 of first junction 178 are formed on the same plane extending in radial direction DR3 and leading end section 193a is formed as a plane extending in radial direction DR3, then, the plane formed by leading end section 193a and the plane formed by root section 193b become almost parallel to each other, so that protrusion 193 represents a substantially trapezoidal shape. Proximal surface 191 and distal surface 192 may be formed on the same plane extending in radial direction DR3, and leading end section 193a may be formed on a plane parallel to that plane, so that protrusion 193 may be formed in a trapezoidal shape. Sidewall sections 193c, 193d may have the same length on the plane shown in FIG. 5, that is, on a cross section of stator core segment 175 perpendicular to axial direction DR1. In this case, protrusion 193 is formed in a substantially isosceles trapezoidal shape.

Protrusion 193 is formed in a substantially trapezoidal shape, and is thus narrowed in width from root section 193b of protrusion 193 to leading end section 193a of protrusion 193. That is, the length of protrusion 193 in radial direction DR3 decreases from root section 193b of protrusion 193 to leading end section 193a of protrusion 193. Sidewall sections 193c, 193d of protrusion 193 are inclined in circumferential direction DR2 such that protrusion 193 is gradually narrowed in width, that is, such that the radial length of protrusion 193 decreases as they approach leading end section 193a from root section 193b in circumferential direction DR2. Sidewall sections 193c, 193d are sloped such that protrusion 193 is narrowed in width from root section 193b to leading end section 193a.

As shown in FIG. 5, protrusion 193 is formed to have leading end section 193a of a radial length r3 and to have root section 193b of a radial length r4. On the plane shown in FIG. 5, the midpoint of a line segment of length r3 formed by leading end section 193a extending in the radial direction and the midpoint of a line segment of length r4 formed by root section 193b extending in the radial direction are arranged on the same circle centering on a point corresponding to the central axis of stator core 141. The midpoint of the line segment formed by leading end section 193a and the midpoint of the line segment formed by root section 193b are located on the same arc extending in circumferential direction DR2. Caulking site 187 extends along the above-described arc.

The position at which caulking site 187 is formed in radial direction DR3 corresponds to the central point of radial length r3 of leading end section 193a extending in radial direction DR3 and radial length r4 of the virtual plane extending in radial direction DR3 formed by root section 193b. Caulking site 187 extends in circumferential direction DR2, and caulking site 187 is formed such that the curve along which caulking site 187 extends equally divides leading end section 193a and root section 193b into halves in radial direction DR3. Caulking site 187 is formed on an arc passing through the central part of radial length r4 of root section 193b of protrusion 193 and extending in circumferential direction DR2, and is formed on an arc passing through the central part of radial length r3 of leading end section 193a and extending in circumferential direction DR2.

When viewed in plan view in axial direction DR1, caulking site 187 is formed on an arc centering on a point corresponding to the central axis of annular stator core 141 and on an arc passing through the central part of protrusion 193 in radial direction DR3. Therefore, on the plane shown in FIG. 5, the distance between the ends of leading end section 193a and caulking site 187 in radial direction DR3 is half of radial length r3 of leading end section 193a, i.e., r3/2. Besides, on the plane shown in FIG. 5, the distance between the ends of root section 193b and caulking site 187 in radial direction DR3 is half of radial length r4 of root section 193b, i.e., r4/2.

Figure 6:
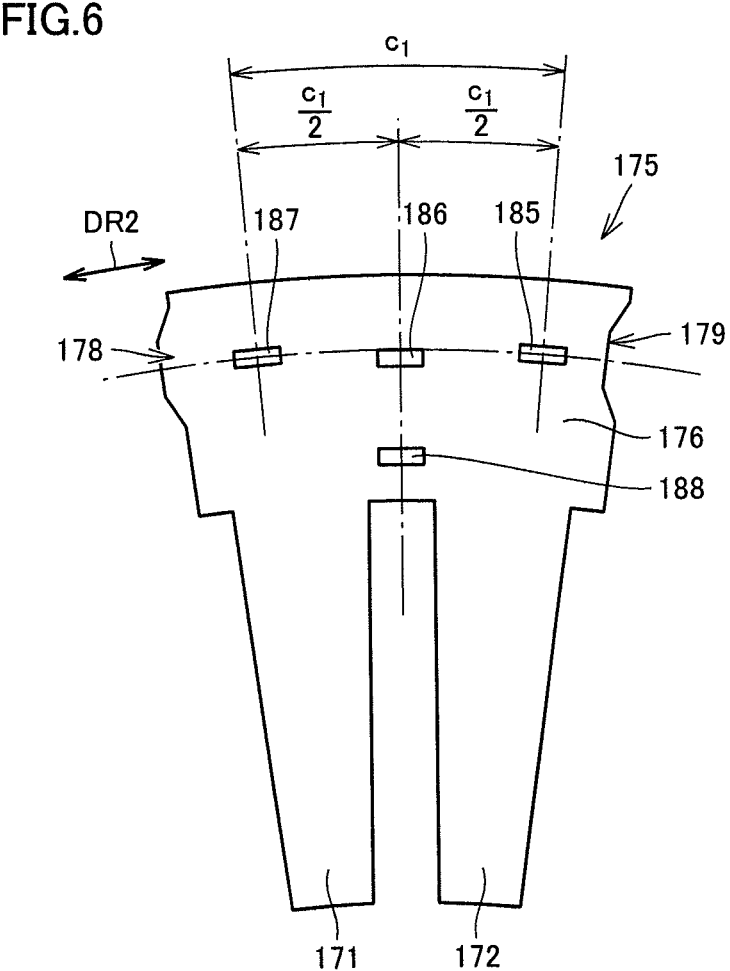
FIG. 6 is a drawing showing positional relationship between caulking sites of the stator core in the circumferential direction.

FIG. 6 is a drawing showing positional relationship between caulking sites 185 to 188 in circumferential direction DR2 of stator core 141. As shown in FIG. 6, caulking site 186 is formed at the central part in circumferential direction DR2 between caulking site 187 formed in proximity to first junction 178 and caulking site 185 formed in proximity to second junction 179.

A spacing between caulking site 187 and second caulking site 186 in circumferential direction DR2 is equal to the spacing between second caulking site 186 and third caulking site 185 in circumferential direction DR2. That is, as shown in FIG. 6, assuming the distance from caulking site 185 to caulking site 187 of stator core 141 in circumferential direction DR2 as c1, the distance from caulking site 185 to caulking site 186 in circumferential direction DR2 and the distance from caulking site 186 to caulking site 187 in circumferential direction DR2 are both c1/2.

Caulking sites 186, 188 are formed on the same plane in radial direction DR3 of stator core 141. Caulking sites 186, 188 are formed at the central part between the positions in circumferential direction DR2 at which two stator teeth 171, 172 are arranged. In yoke part 176 of stator core segment 175, caulking sites 186, 188 are formed at positions corresponding to an area between two stator teeth 171, 172.

Stator core segment 175 is formed in a symmetric shape with respect to circumferential direction DR2 except for protrusion 193 formed at first junction 178 and recess 196 formed at second junction 179. Caulking sites 186, 188 are formed on symmetric axes of stator core segment 175 of symmetric shape with respect to circumferential direction DR2. Caulking sites 185, 187 are formed at positions spaced from caulking site 186 by an equal distance in circumferential direction DR2. Therefore, caulking sites 185, 187 are formed at positions symmetric with respect to circumferential direction DR2.

Figure 7:
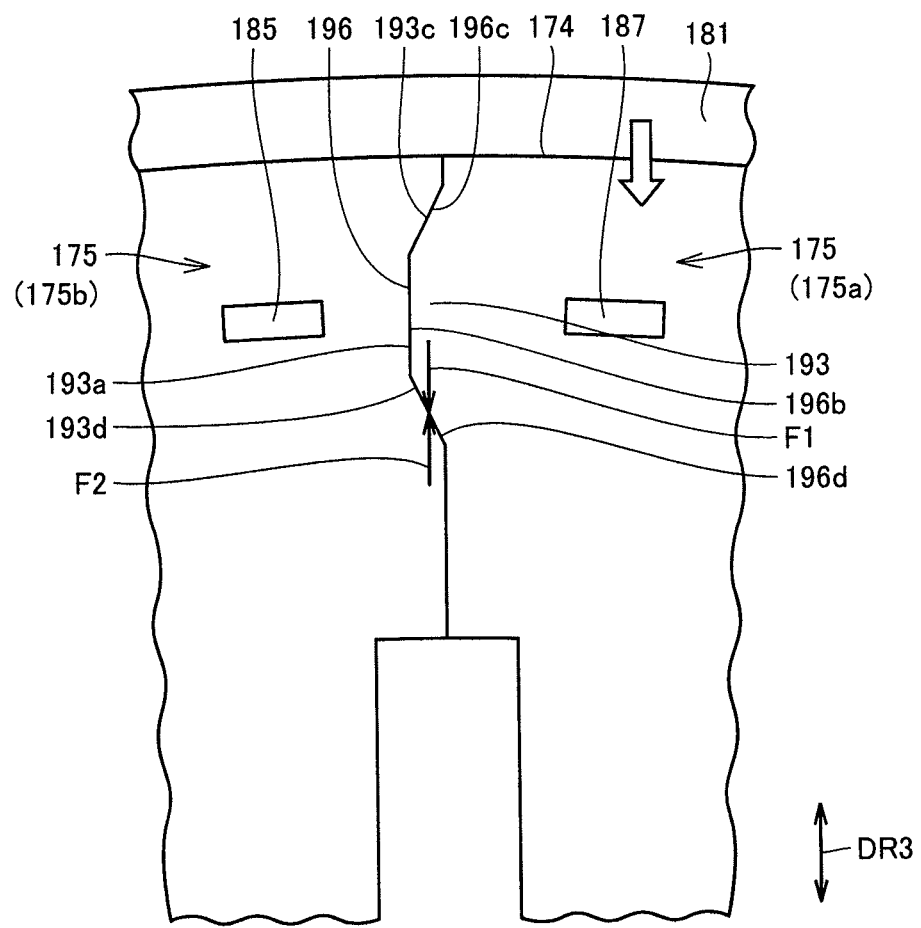
FIG. 7 is a drawing showing the state where adjacent stator core segments have been assembled.

Behaviors of stator core 141 when a stress acts on stator core 141 having the above-described structure from ring 181 at the outer circumferential side will now be described. FIG. 7 is a drawing showing the state where adjacent stator core segments 175 have been assembled. FIG. 7 shows a junction between two stator core segments 175 adjacent to each other, and protrusion 193 formed at first junction 178 of one stator core segment 175a is fitted within recess 196 formed at second junction 179 of the other adjacent stator core segment 175b. Recess 196 receives protrusion 193.

At this time, sidewall sections 193c, 193d representing oblique lines of protrusion 193 formed in a substantially trapezoidal shape come into surface contact with sidewall sections 196c, 196d representing oblique lines of recess 196 formed in a substantially trapezoidal shape. As shown in FIG. 7, sidewall section 193c of protrusion 193 is in surface contact with sidewall section 196c of recess 196. Sidewall section 193d of protrusion 193 is in surface contact with sidewall section 196d of recess 196.

Although leading end section 193a of protrusion 193 and deepest section 196b of recess 196 are similarly shown as being in surface contact in FIG. 7, leading end section 193a and deepest section 196b do not necessarily need to be in contact with each other. A clearance may be left between leading end section 193a and deepest section 196b such that a tolerance at the time of manufacturing protrusion 193 and recess 196 can be permitted. Similarly, a clearance may be left between proximal surface 191 of first junction 178 and proximal surface 197 of second junction 179, and a clearance may be left between distal surface 192 of first junction 178 and distal surface 195 of the second junction.

After stator core segments 175 are arranged annularly, ring 181 is arranged at the outer circumferential side of stator core segments 175 and shrink fitting is performed using ring 181, so that stator core segments 175 are secured together to form stator core 141. At the time of this shrink fitting, a stress may not act uniformly on each stator core segment 175 from ring 181 because of a manufacturing tolerance of the inner circumferential surface of ring 181 formed by punching by press working, a manufacturing tolerance of an outer circumferential surface 174 of stator core segment 175, and the like.

FIG. 7 shows an example where a larger compression stress acts on stator core segment 175a toward the inner side in radial direction DR3 than on stator core segment 175b. As indicated by a blank arrow in FIG. 7, a stress directed to the central side of annular stator core 141 in radial direction DR3 acts on stator core segment 175a from ring 181.

In accordance with this stress, a force F1 shown in FIG. 7 acts on sidewall section 196d from sidewall section 193d being in surface contact with stator core segment 175b to which stator core segment 175a is adjacent. Sidewall sections 193d, 196d are both inclined in radial direction DR3, and are in surface contact with each other. Therefore, if force F1 in the radial direction acts on stator core segment 175b from stator core segment 175a, a reaction force F2 against force F1 acts on stator core segment 175a from stator core segment 175b.

By the action of this reaction force F2, stator core segment 175a having received the stress toward the inner side in radial direction DR3 from ring 181 can be prevented from moving toward the central side in radial direction DR3. Reaction force F2 applied to stator core segment 175a from stator core segment 175b acts as a restricting force that restricts the movement of stator core segment 175a.

In this manner, when the stress toward the inner side in radial direction DR3 acts on stator core segment 175a from ring 181, a stress toward the outer side in radial direction DR3 is simultaneously applied to stator core segment 175a from adjacent stator core segment 175b. Therefore, stator core segment 175a can be prevented from moving toward the inner side in radial direction DR3, and stator core segment 175a can be prevented from moving relative to adjacent stator core segment 175b. Since a shift of stator core segment 175a in radial direction DR3 can be prevented by the reaction force of adjacent stator core segment 175b, positioning accuracy of stator core segments 175 can be improved.

Figure 8:
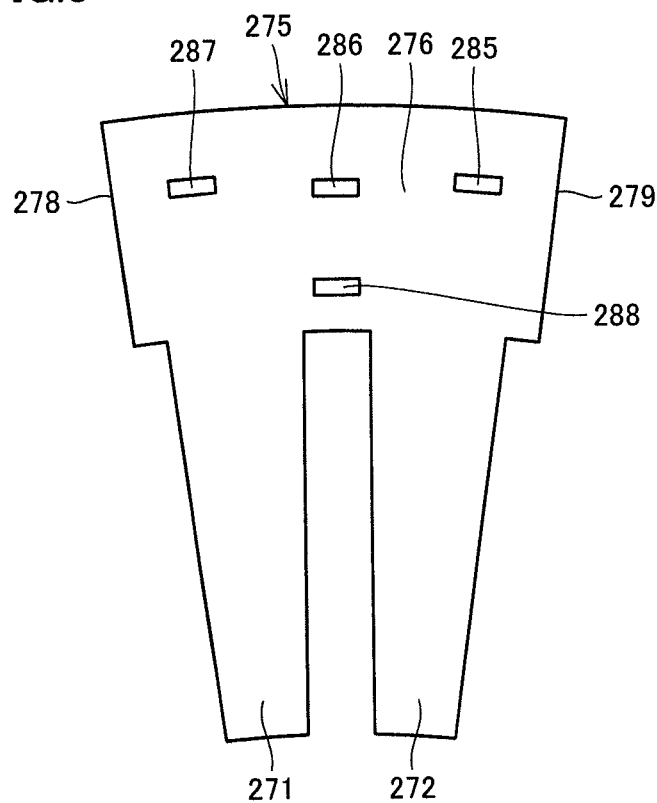
FIG. 8 is a plan view showing a structure of a stator core segment for comparison.

Effects obtained by stator core segment 175 of the present embodiment will now be described as compared to a stator core segment for comparison having a conventional shape. FIG. 8 is a plan view showing a structure of a stator core segment 275 for comparison.

Stator core segment 275 for comparison has a structure similar to that of stator core segment 175 of the present embodiment. However, stator core segment 275 for comparison has junctions 278, 279 of planar shape in radial direction DR3, without either protrusion or recess formed at the both ends in circumferential direction DR2 of yoke part 276. Stator core segment 275 is joined by bringing planar junctions 278, 279 into contact with other stator core segments adjacent in circumferential direction DR2.

Since junctions 278, 279 have the planar form in radial direction DR3, a reaction force in radial direction DR3 does not act on stator core segment 275 from other adjacent stator core segments, unlike the first embodiment. Therefore, in the case where a stress does not act uniformly on each stator core segment 275 from the ring when shrink fitting the ring at the outer circumferential side of stator core segments 275, a relative displacement in radial direction DR3 occurs between adjacent stator core segments 275.

Figure 9:
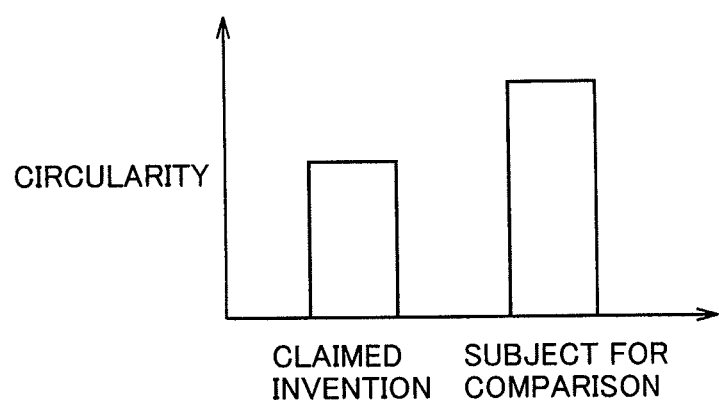
FIG. 9 is a graph showing comparison of circularity between the stator core segment of the present invention and the stator core segment for comparison.

FIG. 9 is a graph showing comparison of circularity between stator core segment 175 of the present invention and stator core segment 275 for comparison. The vertical axis of the graph shown in FIG. 9 indicates circularity. Here, the circularity refers to the magnitude of a deviation of a circular configuration from a geometrically correct circle. The circular configuration refers to a portion which should be a circle functionally, such as a circular shape or a trajectory of rotary motion. The circularity is expressed by the difference in distance in the radial direction between two concentric geometric circles with a circular configuration interposed therebetween in the case where the difference in distance in the radial direction between the concentric circles is at a minimum. That is, as the circularity decreases, the circular configuration becomes a shape closer to a geometric circle.

As described above, when stator core segments 175, 275 are secured by shrink fitting by means of cylindrical ring 181 from the outer circumferential side, stresses applied from ring 181 to respective stator core segments 175, 275 are different. Therefore, stator core segments 175, 275 changes in circularity after shrink fitting. When comparing the circularity, since there would be no difference in circularity if a surface of ring 181 at the inner circumferential side is completely a true circle, ring 181 intentionally deteriorated in circularity at the inner diameter side was used to make comparison of circularity of the surface at the inner diameter side of stator core segment 175 shown in FIG. 9.

As shown in FIG. 9, with stator core segment 275 for comparison, a relative displacement occurs between adjacent stator core segments 275, so that the circularity is large. That is, the deviation of stator core segment 275 from the true circle is great. In contrast, with stator core segment 175 of the first embodiment, adjacent stator core segments 175 are prevented from being displaced in radial direction DR3, so that the circularity is smaller, which allows stator core segments 175 to be arranged more closely to the true circle. As described, even if the accuracy of ring 181 is poor, a reaction force works between stator core segment 175 and another stator core segment 175 adjacent thereto, so that stator core 141 can be improved in circularity.

Figure 10:
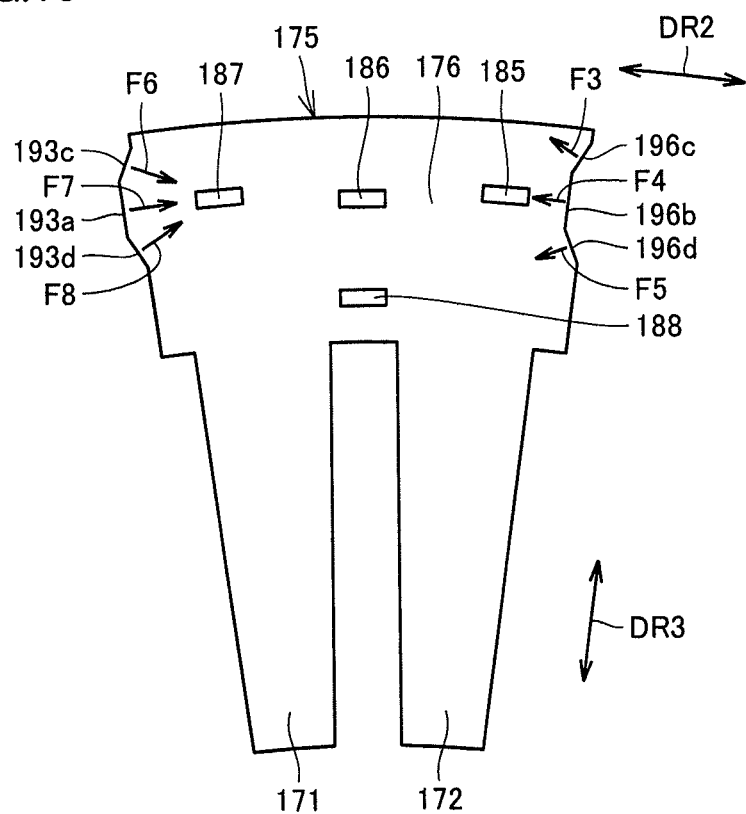
FIG. 10 is a drawing showing compression stresses in the circumferential direction acting on a stator core segment from other stator core segments adjacent in the circumferential direction.

FIG. 10 is a drawing showing compression stresses F3 to F8 in circumferential direction DR2 acting on stator core segment 175 from other stator core segments adjacent thereto in circumferential direction DR2. When ring 181 is shrink fitted at the outer circumferential side of stator core 141, a stress acts from ring 181 toward the inner side in radial direction DR3. The stress acts on the whole stator core 141 from ring 181 so as to reduce the diameter of stator core 141. By reducing stator core 141 in diameter, a compression stress in circumferential direction DR2 occurs between adjacent stator core segments 175.

Stator core segment 175 contacts other adjacent stator core segments with sidewall section 193c and sidewall section 196c inclined with respect to circumferential direction DR2 being in surface contact with each other and with sidewall section 193d and sidewall section 196d being in surface contact with each other. Stator core segment 175 abuts on other adjacent stator core segments at tapered surfaces, and compression stresses in circumferential direction DR2 act on other stator core segments from stator core segment 175 through sidewall sections 193c, 193d, 196c, and 196d. Therefore, the compression stress in circumferential direction DR2 described above is decomposed, and a stress component in radial direction DR3 is produced.

A compression stress acts on second junction 179 of stator core segment 175 from first junction 178 of an adjacent stator core segment. Recess 196 is formed at second junction 179, and the compression stress in circumferential direction DR2 acting on sidewall sections 196c, 196d of recess 196 inclined with respect to radial direction DR3 is distributed in radial direction DR3. That is, stress F3 directed toward the outer side in radial direction DR3 acts on sidewall section 196c located at the outer circumferential side relative to deepest section 196b of recess 196. On the other hand, stress F5 directed toward the inner side in radial direction DR3 acts on sidewall section 196d located at the inner circumferential side relative to deepest section 196b.

Figure 11:
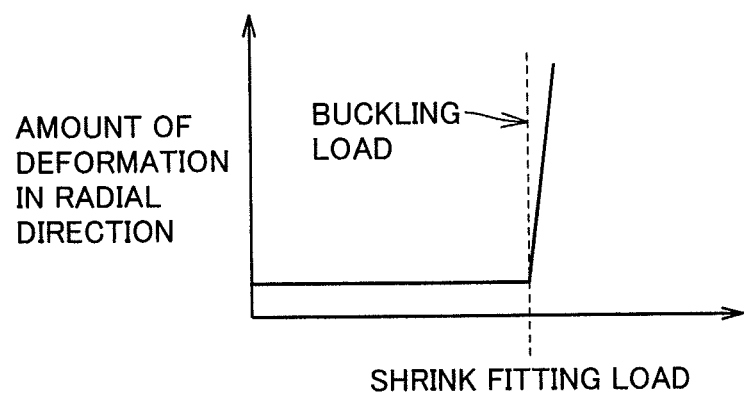
FIG. 11 is a graph explaining buckling of electromagnetic steel plates constituting the stator core segment.

By thus distributing stresses in radial direction DR3, a component in circumferential direction DR2 of stresses acting on stator core segment 175 is reduced. If an excessive compression stress acts in circumferential direction DR2, electromagnetic steel plates constituting stator core segment 175 may be bent and broken, that is, the electromagnetic steel plates may buckle. FIG. 11 is a graph explaining buckling of electromagnetic steel plates constituting stator core segment 175. The horizontal axis of the graph shown in FIG. 11 indicates a shrink fitting load acting on stator core segment 175, and the vertical axis indicates an amount of deformation of the electromagnetic steel plates constituting stator core segment 175 in axial direction DR1.

As shown in FIG. 11, when shrink fitting ring 181 to stator core segments 175, the load (shrink fitting load) in radial direction DR3 acting on stator core segments 175 from ring 181 increases gradually. As the shrink fitting load increases, a compression stress acting on the electromagnetic steel plates in circumferential direction DR2 also increases. In excess of a certain load, the electromagnetic steel plates buckle, so that the amount of deformation of the electromagnetic steel plates in the axial direction increases abruptly. A threshold value of this load that causes a buckling phenomenon in the electromagnetic steel plates will be referred to as a buckling load.

By shrink fitting ring 181, a compression stress in circumferential direction DR2 acts on stator core segment 175 from another adjacent stator core segment. This compression stress in circumferential direction DR2 will cause the electromagnetic steel plates constituting stator core segment 175 to buckle. In the present embodiment, by forming recess 196 in stator core segment 175 and receiving a compression stress at the surface inclined with respect to radial direction DR3, the stress can be distributed in radial direction DR3 as well. Therefore, the electromagnetic steel plates can have a higher buckling load.

Moreover, as shown in FIG. 10, a compression stress acts on first junction 178 of stator core segment 175 from second junction 179 of another adjacent stator core segment. Protrusion 193 is formed at first junction 178, and a compression stress in circumferential direction DR2 acting on sidewall sections 193c, 193d of protrusion 193 inclined with respect to radial direction DR3 concentrates in radial direction DR3. That is, stress F6 directed toward the inner side in radial direction DR3 acts on sidewall section 193c located at the outer circumferential side relative to leading end section 193a of protrusion 193. On the other hand, stress F8 directed toward the outer side in radial direction DR3 acts on sidewall section 193d located at the inner circumferential side relative to leading end section 193a.

In this manner, in proximity to first junction 178 of stator core segment 175, there is a portion where the compression stress in circumferential direction DR2 acting from adjacent stator core segment 175 concentrates. However, stator core segment 175 of the present embodiment is configured such that caulking site 187 is formed at this stress concentrated area, and electromagnetic steel plates are secured in axial direction DR1 at the stress concentrated position. Caulking site 187 is formed at a portion where a compression stress concentrates in yoke part 176 with an end in circumferential direction DR2 closer to first junction 178 being pressed from adjacent stator core segment 175. Stator core segment 175 is improved in strength by forming caulking site 187, and thus can have a higher buckling load.

Figure 12:
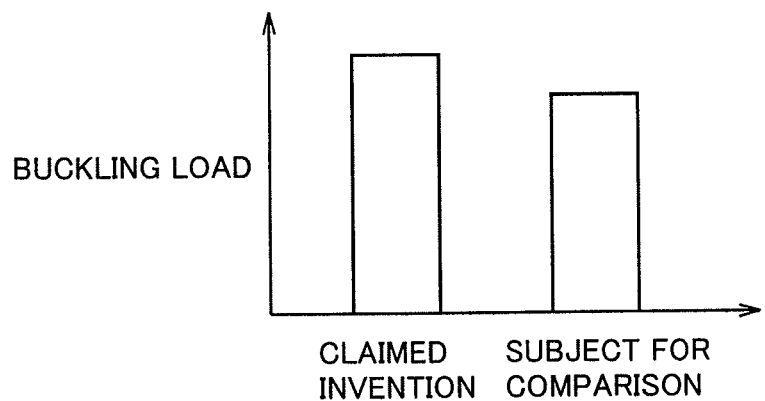
FIG. 12 is a graph showing comparison of buckling load between the stator core segment of the present invention and the stator core segment for comparison.

FIG. 12 is a graph showing comparison of buckling load between stator core segment 175 of the present invention and stator core segment 275 for comparison. The vertical axis of the graph shown in FIG. 12 indicates buckling load. As described above, according to stator core segment 175 of the present embodiment, a stress is distributed in radial direction DR3 because recess 196 is formed at second junction 179 and caulking site 187 is formed at the stress concentrated position in proximity to first junction 178, therefore a buckling load is increased, leading to less likelihood of buckling. On the other hand, in the case of stator core segment 275 for comparison shown in FIG. 8, the effect of distributing a stress in the radial direction is not produced, and the effect of increasing a proof stress against a compression stress by means of caulking site 287 and increasing a buckling load is small.

Consequently, as shown in FIG. 12, stator core segment 175 of the present invention can have a higher buckling load than stator core segment 275 for comparison. Therefore, when an identical stress toward the inner side in radial direction DR3 acts from ring 181, stator core segment 275 for comparison is more likely to buckle under this stress. In other words, according to stator core segment 175 of the present invention, the electromagnetic steel plates constituting stator core segment 175 can be prevented from buckling even when a stronger stress is applied from ring 181.

As to the size of substantially trapezoidal shapes formed by protrusion 193 and recess 196, respectively, the ratio between the length of leading end section 193a of protrusion 193 and the length of sidewall sections 193c, 193d in radial direction DR3 can be expressed as 6:1, for example. That is, as shown in FIG. 5, assuming the radial length of leading end section 193a as r3 and the radial length of root section 193b as r4, r3:(r4/2−r3/2)=6:1 can be obtained. This can be transformed to eventually obtain r3:r4=3:4. Similarly, as to radial length r1 of deepest section 196b of recess 196 and radial length r2 of opening 196a, r1:r2=3:4 can be obtained.

The buckling stress of the electromagnetic steel plates constituting stator core segment 175 varies depending on the width of a portion where protrusion 193 and recess 196 abut on each other, that is, the magnitude of length of sidewall sections 193c, 193d, 196c, and 196d in radial direction DR3. If radial length r3 of leading end section 193a is too long relative to the whole radial length of protrusion 193 (i.e., radial length r4 of root section 193b), the distance from sidewall sections 193c, 193d to be in surface contact with sidewall sections 196c, 196d of recess 196 to caulking site 187 increases, which degrades the function of caulking site 187 as a restraining point. On the other hand, if radial length r3 of leading end section 193a is too short, the accuracy of sidewall sections 193c, 193d will be degraded in stability.

In consideration of these, the ratio between radial length r3 of leading end section 193a and radial length r4 of root section 193b can be expressed as 3:4, and the ratio between radial length r1 of deepest section 196b and radial length r2 of opening 196a can be similarly expressed as 3:4.

The distance between leading end section 193a and root section 193b in circumferential direction DR2 that corresponds to the height of substantially trapezoidal shape can be determined within the range of more than or equal to 3/16 and less than or equal to 1/4 relative to radial length r4. That is, assuming the spacing between leading end section 193a and root section 193b as h, h:r3:r4=0.75-1:3:4 can be obtained. Assuming the distance between opening 196a and deepest section 196b of recess 196 in circumferential direction DR2 as d, d:r1:r2=0.75-1:3:4 can also be obtained similarly for this distance d.

If the height of substantially trapezoidal shape is too large, the accuracy in assembling adjacent stator core segments 175 will be degraded. On the other hand, if too small, protrusion 193 may not be able to be fitted favorably within recess 196. The above-described values of distance d and distance h can be determined as the heights of an optimal substantially trapezoidal shape for allowing protrusion 193 to be received in recess 196 and allowing adjacent stator core segments 175 to be joined with high accuracy. Then, assemblability when joining stator core segments 175 adjacent to each other in circumferential direction DR2 can be ensured.

Although there will be some repetitions of the description above, the characteristic features of the present embodiment will be enumerated below. In plurality of stator core segments 175 included in stator core 141 of the present embodiment, recess 196 is formed at second junction 179, and recess 196 is formed such that the opening area increases from deepest section 196b to opening 196a. Then, it is not necessary to press fit stator core segments 175 in circumferential direction DR2 when assembling them, and plurality of stator core segments 175 can easily be arranged annularly. Therefore, stator core segments 175 can be assembled easily, so that stator core 141 can be improved in assemblability.

In yoke part 176 of stator core segment 175, caulking site 187 where stator core segment 175 is caulked in axial direction DR1 to integrate the steel plates is formed on an arc passing through the central part of radial length r4 of protrusion 193 and extending in circumferential direction DR2. Then, caulking site 187 is formed at the portion where compression stresses applied from other adjacent stator core segments concentrate when ring 181 is shrink fitted to secure stator core segments 175, so that stator core segment 175 is improved in strength. Therefore, the electromagnetic steel plates constituting stator core segment 175 can have a higher buckling load, so that stator core segment 175 can be improved in rigidity.

Protrusion 193 and recess 196 of stator core segment 175 are each formed such that the sectional shape perpendicular to axial direction DR1 represents a substantially trapezoidal shape. Then, the opening area of recess 196 can be increased from deepest section 196b to opening 196a with reliability. Protrusion 193 to be received in recess 196 is formed in such a shape that the cross-sectional area perpendicular to circumferential direction DR2 increases gradually from leading end section 193a to root section 193b. When protrusion 193 and recess 196 are each formed in a substantially trapezoidal shape whose lower base and each of oblique lines make the same angle, protrusion 193 can easily be fitted into recess 196, so that stator core segments 175 can easily be assembled.

When protrusion 193 is fitted into recess 196, sidewall section 193c of protrusion 193 and sidewall section 196c of recess 196 come into surface contact, and sidewall section 193d of protrusion 193 and sidewall section 196d of recess 196 come into surface contact. Then, stator core segments 175 adjacent to each other in circumferential direction DR2 can be prevented from relatively moving in radial direction DR3. Therefore, stator core segments 175 can be improved in positioning accuracy, so that stator core 141 can be improved in circularity. Besides, compression stresses in circumferential direction DR2 acting from adjacent stator core segments 175 can be distributed in radial direction DR3, so that a component of stress in circumferential direction DR2 can be reduced. Therefore, the electromagnetic steel plates constituting stator core segment 175 can have a higher buckling load.

Caulking site 187 is formed in proximity to first junction 178 of yoke part 176. Then, in yoke part 176 of stator core segment 175 under a compression stress in circumferential direction DR2 from another adjacent stator core segment, caulking site 187 can be formed at a position in more proximity to the stress concentrated area. Therefore, the effect of improving stator core segment 175 in rigidity by means of caulking site 187 can be obtained more prominently.

The position in circumferential direction DR2 at which caulking site 187 is formed is desirably closer to first junction 178 because it is closer to the stress concentrated area, however, if too close, a tolerance at the time of manufacturing stator core segment 175 will be impermissible. It is desirable to determine the position at which caulking site 187 is formed such that the distance away from first junction 178 in circumferential direction DR2 is minimized to such a degree that caulking site 187 can be formed with reliability even in consideration of a tolerance at the time of manufacture.

For example, caulking site 187 may be formed at a position closer to first junction 178 relative to the central part in circumferential direction DR2 of stator teeth 171 located closer to first junction 178. When stator core segment 175 is viewed in plan view in axial direction DR1, caulking site 187 may be formed so as to include at least part of a portion where a plane perpendicular to leading end section 193a of protrusion 193, a plane perpendicular to sidewall section 193c and a plane perpendicular to sidewall section 193d overlap one another.

It is noted that, similarly, caulking site 185 may be formed at a position closer to second junction 179 relative to the central part in circumferential direction DR2 of stator teeth 172 located closer to second junction 179. Caulking sites 185, 187 may be formed such that the distance in circumferential direction DR2 from a virtual plane extending in radial direction DR3 including proximal surface 191 and distal surface 192 of first junction 178 to caulking site 187 is equal to the distance in circumferential direction DR2 from a virtual plane extending in radial direction DR3 including proximal surface 197 and distal surface 195 of second junction 179 to caulking site 185.

Stator core segment 175 includes two stator teeth 171, 172 protruding from yoke part 176 toward the inner side in radial direction DR3. In cylindrical stator core 141, it is more advantageous against buckling to reduce the number of parts of stator core segments 175 arranged annularly in circumferential direction DR2 and increase the dimension of stator core segment 175 in circumferential direction DR2.

That is, stator core segments 175 have a manufacturing tolerance. Each stator core segment 175 has dimensional variations in circumferential direction DR2. Since the tolerance builds up to become large as the number of parts in circumferential direction DR2 increases, dimensional variations of stator core 141 in circumferential direction DR2 increase. Therefore, the dimensional accuracy of stator core 141 in circumferential direction DR2 is degraded, and when assembling stator core segments 175 using ring 181, respective stator core segments 175 may not be secured integrally. Therefore, the dimension in circumferential direction DR2 of stator core segment 175 will be increased when one stator core segment 175 is configured to have two stator teeth 171, 172, which can reduce the number of parts of stator core segments 175 arranged in circumferential direction DR2.

On the other hand, yoke part 176 of stator core segment 175 has a curvature, and stator teeth 171, 172 are arranged radially. If a coil wound around radial stator teeth 171, 172 comes into contact when assembling stator core segments 175 annularly, it will be difficult to assemble stator core segments 175. Therefore, it is supposed that the number of stator teeth included in one stator core segment 175 is limited to two. In this manner, considering the dimensional accuracy of stator core 141 and demands in assembling stator core segments 175, stator core segment 175 having two stator teeth 171, 172 is supposed to be most preferable.

In yoke part 176, caulking site 186 where stator core segment 175 is caulked in axial direction DR1 is formed at the center between two stator teeth 171, 172 in circumferential direction DR2. By forming caulking site 186 between stator teeth 171, 172 formed at regular intervals in circumferential direction DR2, caulking site 186 can be provided at the central part of yoke part 176 in circumferential direction DR2, so that stator core segment 175 can be improved in strength against buckling. By forming a plurality of caulking sites (i.e., caulking site 186 and caulking site 188) between two stator teeth 171, 172 in circumferential direction DR2, stator core segment 175 can further be prevented from buckling.

Caulking site 185 where stator core segment 175 is caulked in axial direction DR1 is formed in proximity to second junction 179 of yoke part 176, and the spacing between caulking site 187 and caulking site 186 in circumferential direction DR2 is equal to the spacing between caulking site 186 and caulking site 185 in circumferential direction DR2. Caulking site 187 is formed at the stress concentrated area in yoke part 176, and caulking site 186 is formed between two stator teeth 171, 172. In a direction opposite to the direction directed from caulking site 186 to caulking site 187 in circumferential direction DR2, caulking site 185 is formed at a position away from caulking site 186 in circumferential direction DR2 by a distance equal to the distance between two caulking sites 186, 187 in circumferential direction DR2. By thus forming caulking site 185, stator core segment 175 can further be improved in strength against a compression stress applied from another stator core segment adjacent in circumferential direction DR2.

Caulking site 185 is formed at the central part of radial length r2 of opening 196a. By thus determining the position at which caulking site 185 is formed, stator core segment 175 can further be improved in strength.

Second Embodiment

Figure 13:
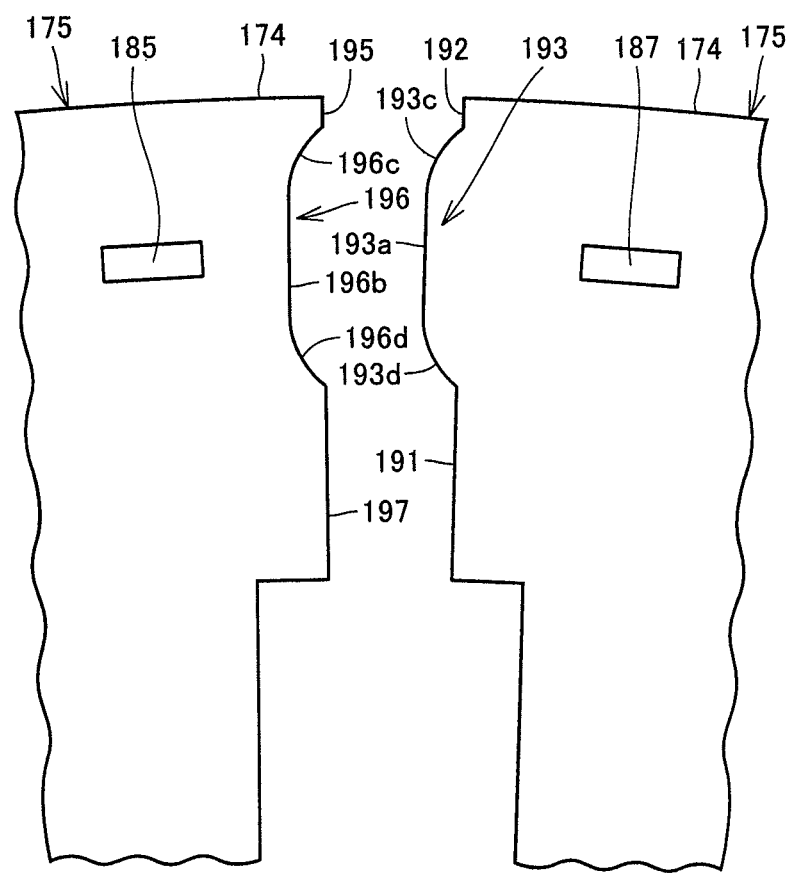
FIG. 13 is a plan view showing a structure of stator core segments of a second embodiment.

FIG. 13 is a plan view showing a structure of stator core segments 175 of a second embodiment. Stator core segment 175 of the second embodiment shown in FIG. 13 differs from the stator core segment of the first embodiment described above in shape of sidewall sections 193c, 193d of protrusion 193 and sidewall sections 196c, 196d of recess 196.

Specifically, sidewall sections 193c, 193d of protrusion 193 of the second embodiment have a curved surface shape curved from leading end section 193a to root section 193b, while the sidewall sections of the protrusion and the recess of the first embodiment are both formed in a planar shape. Similarly, sidewall sections 196c, 196d of recess 196 have a curved surface shape curved from deepest section 196b to opening 196a.

In this manner, in stator core segment 175 of the second embodiment having sidewall sections 193c, 193d, 196c, and 196d of curved surface shape, recess 196 is also formed such that the opening area increases from deepest section 196b to opening 196a, which facilitates assembly of stator core segments 175. Moreover, stator core segment 175 is improved in rigidity because caulking site 187 is formed at the center of the radial length of protrusion 193, so that the electromagnetic steel plates constituting stator core segment 175 can be prevented from buckling.

Third Embodiment

Figure 14:
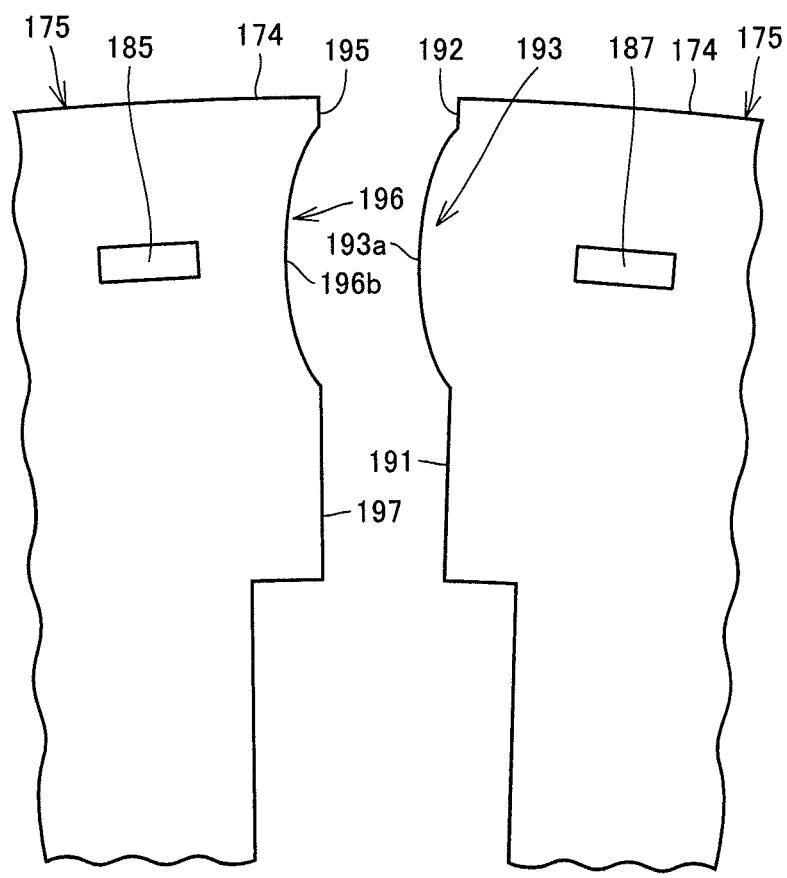
FIG. 14 is a plan view showing a structure of stator core segments of a third embodiment.

FIG. 14 is a plan view showing a structure of stator core segments 175 of a third embodiment. Stator core segment 175 of the third embodiment shown in FIG. 14 differs from the stator core segment of the first embodiment described above in that protrusion 193 and recess 196 are formed in an arc shape in plan view. Unlike the first and second embodiments, leading end section 193a of protrusion 193 and deepest section 196b of recess 196 are not formed in a planar shape, but have a linear form extending in axial direction DR1.

In this manner, in stator core segment 175 of the third embodiment having arc-shaped protrusion 193 and recess 196 as described above, recess 196 is also formed such that the opening area increases from deepest section 196b to opening 196a, which facilitates assembly of stator core segments 175. Moreover, stator core segment 175 is improved in rigidity because caulking site 187 is formed at the center of the radial length of protrusion 193, so that the electromagnetic steel plates constituting stator core segment 175 can be prevented from buckling.

Although the embodiments of the present invention have been described above, it should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 140 stator; 141 stator core; 171, 172 stator teeth; 174 outer circumferential surface; 175, 175a, 175b stator core segment; 176 yoke part; 178 first junction; 179 second junction; 181 ring; 185, 186, 187, 188 caulking site; 191, 197 proximal surface; 192, 195 distal surface; 193 protrusion; 193a leading end section; 193b root section; 193c, 193d, 196c, 196d sidewall section; 196 recess; 196a opening; 196b deepest section; DR1 axial direction; DR2 circumferential direction; DR3 radial direction.

The invention claimed is:

1. A stator core comprising a plurality of stator core segments arranged annularly and formed by stacking a plurality of steel plates in an axial direction, said stator core segment including a yoke part extending in a circumferential direction and two teeth portions protruding from said yoke part toward an inner side in a radial direction, said yoke part having a first junction provided at one end thereof in said circumferential direction and a second junction provided at the other end thereof in said circumferential direction, said first junction and said second junction joining said stator core segment and an other adjacent stator core segment when said stator core segments are arranged annularly, a protrusion protruding toward said other adjacent stator core segment being formed at said first junction, said protrusion being formed such that a cross sectional shape perpendicular to said axial direction represents a substantially trapezoidal shape, and such that a ratio between a length of a leading end section and a length of a root section of said protrusion in said radial direction is expressed as 3:4, a recess capable of receiving said protrusion being formed at said second junction, said recess being formed such that a cross sectional shape perpendicular to said axial direction represents a substantially trapezoidal shape, and such that an opening area increases from a deepest section of said recess to an opening of said recess so that a ratio between a length of said deepest section and a length of said opening of said recess in said radial direction is expressed as 3:4, when fitting said protrusion into said recess, an oblique line of the substantially trapezoidal shape of said protrusion and an oblique line of the substantially trapezoidal shape of said recess coming into surface contact, and a first caulking site where said stator core segment is caulked in said axial direction to integrate said steel plates being formed at a position, of said yoke part, closer to said first junction relative to a central part in said circumferential direction of one stator teeth portion of said two teeth portions that is located closer to said first junction and at a portion where a stress concentrates with said one end being pressed in said circumferential direction.

2. The stator core according to claim 1, wherein in said yoke part, a second caulking site where said stator core segment is caulked in said axial direction is formed at the center between said two teeth portions in said circumferential direction.

3. The stator core according to claim 2, wherein a third caulking site where said stator core segment is caulked in said axial direction is formed in proximity to said second junction of said yoke part, and a spacing between said first caulking site and said second caulking site in said circumferential direction is equal to the spacing between said second caulking site and said third caulking site in said circumferential direction.

4. The stator core according to claim 3, wherein said first caulking site and said third caulking site are formed at positions symmetric with respect to said circumferential direction.

5. The stator core according to claim 1, wherein a ratio among a distance between said leading end section and said root section of said protrusion in said circumferential direction, a length of said leading end section in said radial direction and a length of said root section in said radial direction is expressed as 0.75-1:3:4, and a ratio among a distance between said opening and said deepest section of said recess in said circumferential direction, a length of said deepest section in said radial direction and a length of said opening in said radial direction is expressed as 0.75-1:3:4.

* * * * *